(12) United States Patent
Ono

(10) Patent No.: US 8,228,401 B2
(45) Date of Patent: Jul. 24, 2012

(54) IMAGE CAPTURING AND CORRECTION APPARATUS, IMAGE CAPTURING AND CORRECTION METHOD, AND MEDIUM STORING A PROGRAM

(75) Inventor: Shuji Ono, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 659 days.

(21) Appl. No.: 12/364,969

(22) Filed: Feb. 3, 2009

(65) Prior Publication Data

US 2009/0195672 A1 Aug. 6, 2009

(30) Foreign Application Priority Data

Feb. 5, 2008 (JP) ................................ 2008-025709
Jan. 16, 2009 (JP) ................................ 2009-007991

(51) Int. Cl.
*H04N 5/217* (2006.01)

(52) U.S. Cl. ..................................... 348/241; 348/222.1

(58) Field of Classification Search ............... 348/222.1, 348/241, 335
See application file for complete search history.

(56) References Cited

U.S. PATENT DOCUMENTS

| | | | | |
|---|---|---|---|---|
| 2005/0007478 A1* | 1/2005 | Ahiska | ........................... | 348/335 |
| 2005/0013599 A1* | 1/2005 | Nakanishi et al. | ................. | 396/2 |
| 2007/0285553 A1* | 12/2007 | Morita et al. | .................. | 348/335 |
| 2008/0007797 A1* | 1/2008 | Hayashi et al. | ................ | 358/474 |
| 2009/0041378 A1* | 2/2009 | Yamaoka et al. | .............. | 382/275 |
| 2009/0160996 A1* | 6/2009 | Yamaoka et al. | ......... | 348/333.11 |
| 2010/0165104 A1* | 7/2010 | Fujita et al. | .................... | 348/148 |

FOREIGN PATENT DOCUMENTS

| | | |
|---|---|---|
| JP | 2001-311867 A | 11/2001 |
| JP | 2006-519527 A | 8/2006 |

\* cited by examiner

*Primary Examiner* — Gevell Selby
(74) *Attorney, Agent, or Firm* — Sughrue Mion, PLLC

(57) ABSTRACT

Provided is an image processing apparatus comprising a region identifying section that identifies a partial region that fulfills a preset condition in a main image captured through an optical system in which an optical transfer function relating to light from an object point is substantially uniform regardless of a distance to the object point; and a correcting section that corrects an image of the partial region identified by the region identifying section, according to the optical transfer function of the optical system. The image processing apparatus may further comprise a condition storing section that stores the condition to be fulfilled by the partial region corrected by the correcting section, and the region identifying section may identify a partial region of the main image that fulfills the condition stored by the condition storing section.

15 Claims, 18 Drawing Sheets

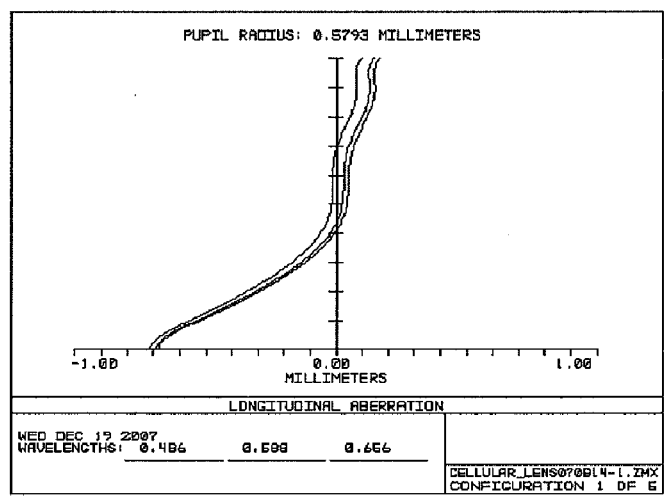
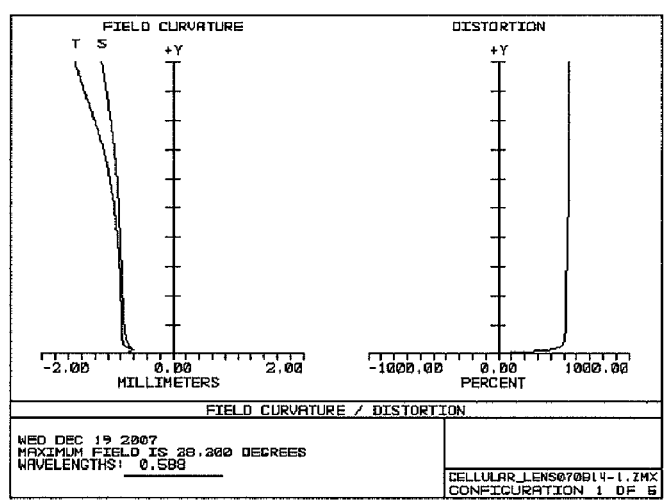
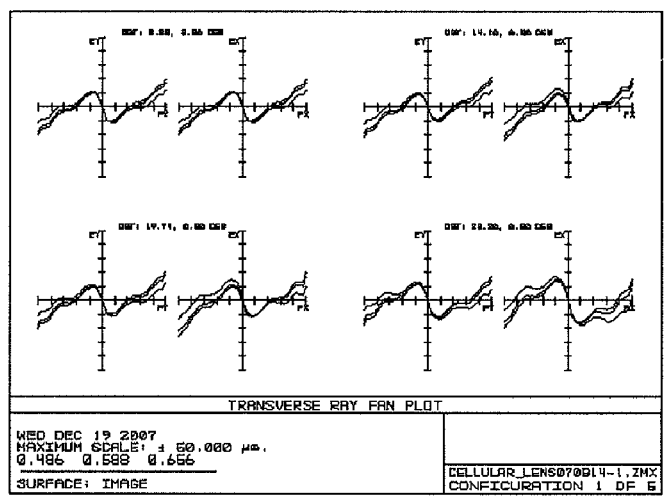
FIG. 4

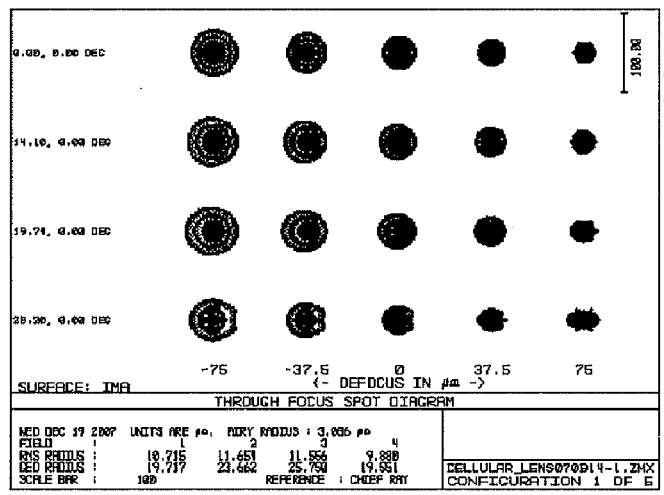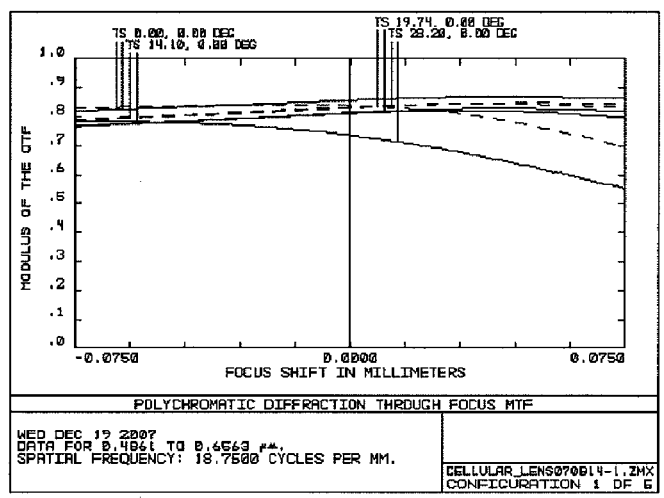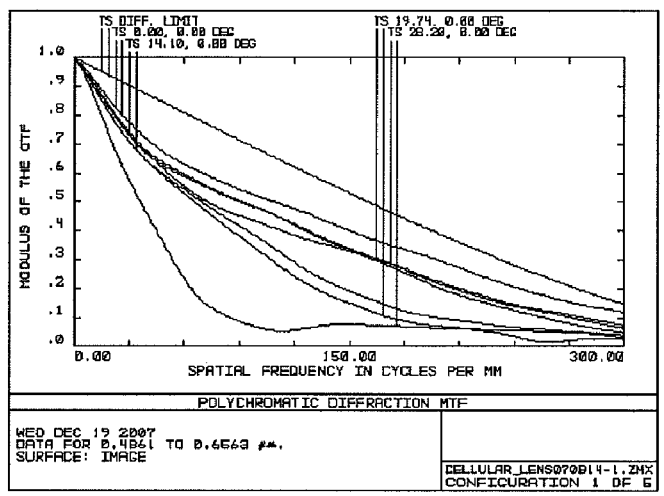
FIG.5

| DISTANCE | BRIGHTNESS | TYPE | COLOR |
|---|---|---|---|
| DISTANCE $D_1$ TO DISTANCE $D_2$ | LUMINANCE $I_1$ TO LUMINANCE $I_2$ | SHAPE CHARACTERISTIC AMOUNT ... | COLOR CHARACTERISTIC AMOUNT ... |

| IMAGE REGION | DISTANCE RANGE | | INVERSE FILTER |
|---|---|---|---|
| A | SHORT | → | SHORT RANGE FILTER A1 |
| A | MID | → | MID RANGE FILTER A2 |
| A | LONG | → | LONG RANGE FILTER A3 |
| A | SHORT AND MID | → | SHORT AND MID RANGE FILTER A4 |
| A | MID AND LONG | → | MID AND LONG RANGE FILTER A5 |
| A | SHORT, MID, AND LONG | → | SHORT, MID, AND LONG RANGE FILTER A6 |
| B | SHORT | → | SHORT RANGE FILTER B1 |
| B | MID | → | MID RANGE FILTER B2 |
| B | LONG | → | LONG RANGE FILTER B3 |
| B | SHORT AND MID | → | SHORT AND MID RANGE FILTER B4 |
| B | MID AND LONG | → | MID AND LONG RANGE FILTER B5 |
| C | SHORT | → | SHORT RANGE FILTER C1 |
| ⋮ | ⋮ | → | ⋮ |
| E | SHORT | → | SHORT RANGE FILTER E1 |
| E | MID | → | MID RANGE FILTER E2 |
| E | LONG | → | LONG RANGE FILTER E3 |
| E | SHORT AND MID | → | SHORT AND MID RANGE FILTER E4 |
| E | MID AND LONG | → | MID AND LONG RANGE FILTER E5 |
| F | SHORT | → | SHORT RANGE FILTER F1 |
| ⋮ | ⋮ | → | ⋮ |

FIG. 14

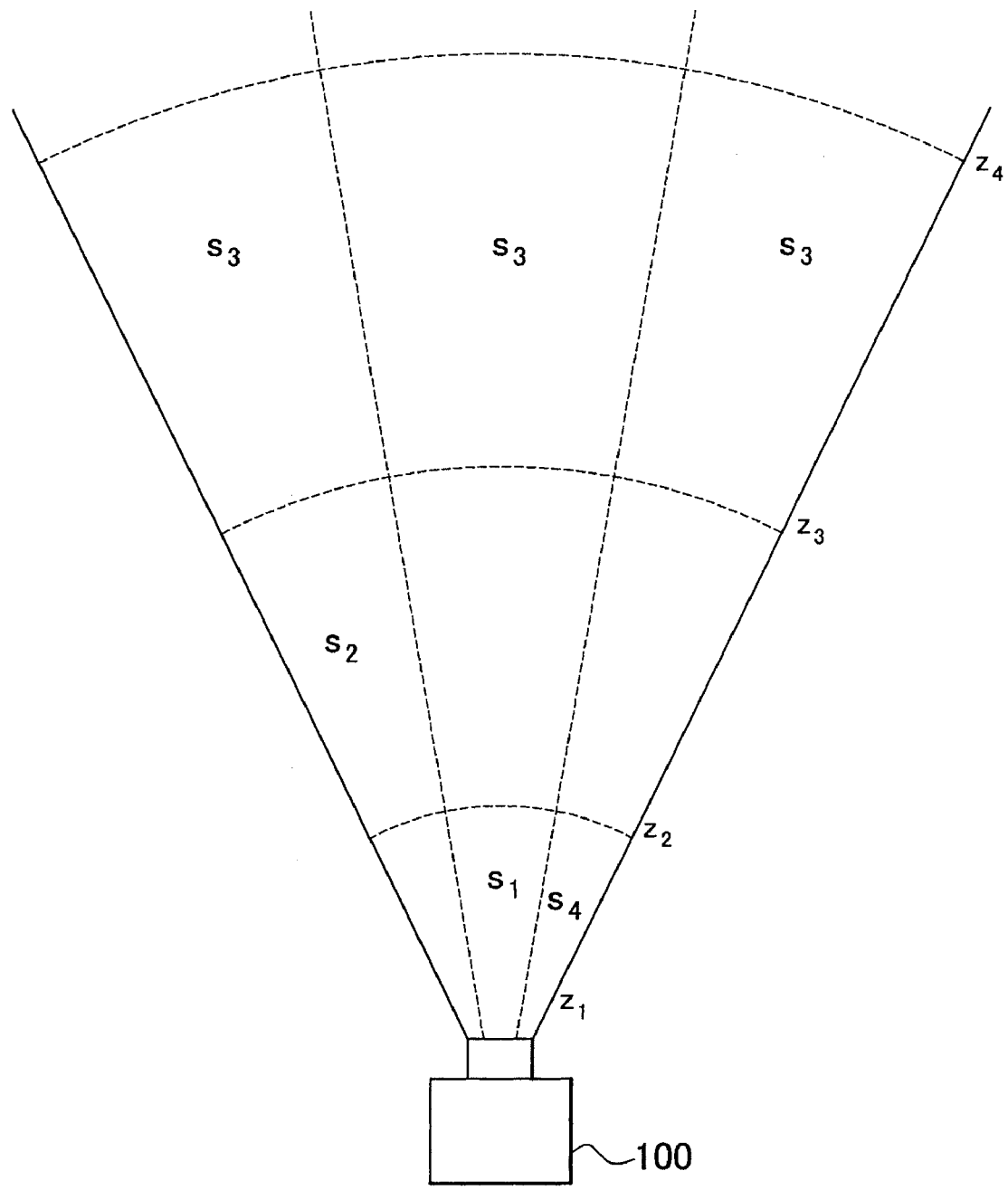
F I G . 17

IMAGE CAPTURING AND CORRECTION APPARATUS, IMAGE CAPTURING AND CORRECTION METHOD, AND MEDIUM STORING A PROGRAM

CROSS REFERENCE TO RELATED APPLICATION

The present application claims priority from Japanese Patent Applications No. 2008-025709 filed on Feb. 5, 2008 and No. 2009-007991 filed on Jan. 16, 2009, the contents of which are incorporated herein by reference.

BACKGROUND

1. Technical Field

The present invention relates to an image processing apparatus, an image processing method, and a program. In particular, the present invention relates to an image processing apparatus and an image processing method for processing an image, and a computer readable medium storing thereon a program used by image processing apparatus.

2. Description of the Related Art

A camera provided with an objective lens having a PSF two times greater than the pitch of the light receiving element array is known as in, for example, Japanese Unexamined Patent Application Publication No. 2006-519527. Furthermore, an electronic camera that can easily capture quality images by switching between image capturing and image processing according to a selected image capturing mode is known as in, for example, Japanese Patent Application Publication No. 2001-311867.

The invention disclosed in JP 2006-519527 restores an entire image, but uses a process having a very high computational cost. Furthermore, a difference arises in the OTF between objects that are at very different distances, and may also arise between an object on the optical axis and an object off of the optical axis. Accordingly, when performing the same restoration process for all of the image regions, there is a problem that artifacts are generated. JP 2001-311867 does not disclose a correction method using the optical transfer function.

SUMMARY

Therefore, it is an object of an aspect of the innovations herein to provide an image capturing apparatus, an image capturing method and a computer readable medium which are capable of overcoming the above drawbacks accompanying the related art. The above and other objects can be achieved by combinations described in the independent claims. The dependent claims define further advantageous and exemplary combinations of the innovations herein.

According to the first aspect related to the innovations herein, one exemplary image processing apparatus comprises a region identifying section that identifies a partial region that fulfills a preset condition in a main image captured through an optical system in which an optical transfer function relating to light from an object point is substantially uniform regardless of a distance to the object point; and a correcting section that corrects an image of the partial region identified by the region identifying section, according to the optical transfer function of the optical system.

According to the second aspect related to the innovations herein, one exemplary image processing method comprises identifying a partial region that fulfills a preset condition in a main image captured through an optical system in which an optical transfer function relating to light from an object point is substantially uniform regardless of a distance to the object point; and correcting an image of the identified partial region according to the optical transfer function of the optical system.

According to the third aspect related to the innovations herein, one exemplary storage medium may include computer readable medium storing thereon a program used by an image processing apparatus, the program causing a computer to function as a region identifying section that identifies a partial region that fulfills a preset condition in a main image captured through an optical system in which an optical transfer function relating to light from an object point is substantially uniform regardless of a distance to the object point; and a correcting section that corrects an image of the partial region identified by the region identifying section, according to the optical transfer function of the optical system.

According to the fourth aspect related to the innovations herein, one exemplary image processing apparatus comprises a correcting section that corrects an image captured through an optical system in which an optical transfer function relating to light from an object point is substantially uniform regardless of a distance to the object point, according to the optical transfer function of the optical system; a region identifying section that identifies, in the image corrected by the correcting section, an overcorrected partial region in which an optical response of the optical system is overcorrected; and a correction control section that suppresses intensity of the correction by the correcting section in the overcorrected partial region identified by the region identifying section.

According to the fifth aspect related to the innovations herein, one exemplary image processing method comprises correcting an image captured through an optical system in which an optical transfer function relating to light from an object point is substantially uniform regardless of a distance to the object point, according to the optical transfer function of the optical system; identifying, in the corrected image, an overcorrected partial region in which an optical response of the optical system is overcorrected; and controlling intensity of the correction in the identified overcorrected partial region.

According to the sixth aspect related to the innovations herein, one exemplary storage medium may include a computer readable medium storing thereon a program used by an image processing apparatus, the program causing a computer to function as a correcting section that corrects an image captured through an optical system in which an optical transfer function relating to light from an object point is substantially uniform regardless of a distance to the object point, according to the optical transfer function of the optical system; a region identifying section that identifies, in the image corrected by the correcting section, an overcorrected partial region in which an optical response of the optical system is overcorrected; and a correction control section that suppresses intensity of the correction by the correcting section in the overcorrected partial region identified by the region identifying section.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 4 illustrates aberration characteristics of the lens system 110 shown in FIG. 3.

FIG. 5 illustrates optical transfer characteristics of the lens system 110 shown in FIG. 3.

FIG. 8 illustrates exemplary data stored on a condition storing section 180 by using a table.

FIG. 14 shows an exemplary table of information stored by the condition storing section 180 and the parameter storing section 185.

FIG. 17 shows a positional relation between the image capturing apparatus 100 and the subjects.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Figure 1:
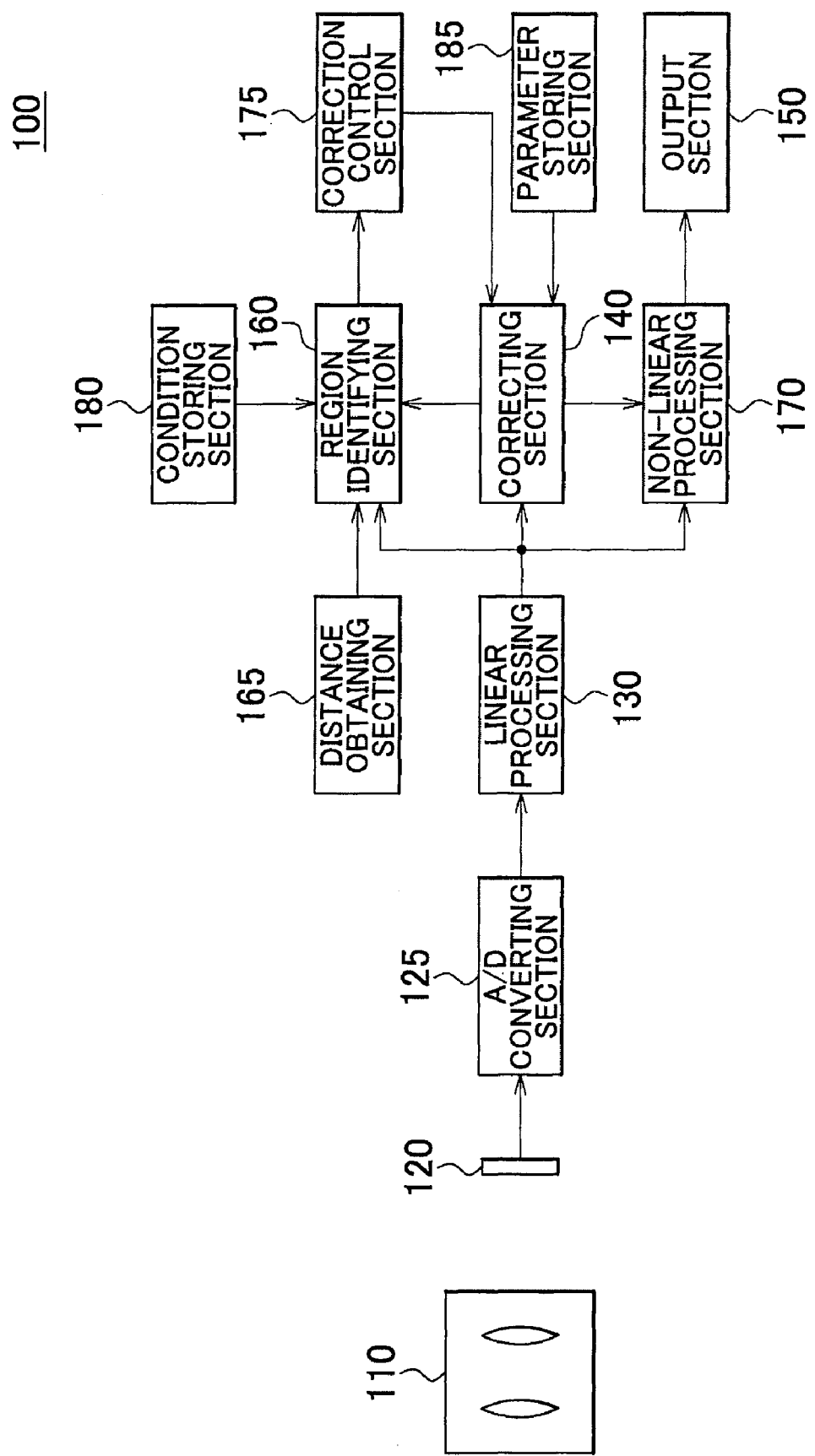
FIG. 1 illustrates an exemplary block configuration of an image capturing apparatus 100 relating to an embodiment of the present invention.

FIG. 1 illustrates an exemplary block configuration of an image capturing apparatus 100 relating to an embodiment of the present invention. The image capturing apparatus 100 image-captures a subject and generates an image. The image capturing apparatus 100 includes a lens system 110, a light receiving section 120, an A/D converting section 125, a linear processing section 130, a correcting section 140, a non-linear processing section 170, an output section 150, a region identifying section 160, a distance obtaining section 165, a condition storing section 180, a parameter storing section 185, and a correction control section 175. The lens system 110 exemplifies an optical system that focuses light, and the light receiving section 120 receives light that has passed through the lens system 110.

The lens system 110 achieves substantially the same optical transfer function for light from an object point, irrespective of the distance between the object point and the lens system 110. The optical characteristics of the lens system 110 are qualitatively described with reference to FIG. 2.

The light receiving section 120 includes a plurality of light receiving elements arranged two-dimensionally. The light receiving elements receive light from a subject that is focused by the lens system 110. The A/D converting section 125 A/D converts a signal indicative of the amount of the light received by each of the light receiving elements and supplies a digital pixel value that is linearly related to the amount of the received light to the linear processing section 130. The linear processing section 130 processes the pixel value while maintaining the linear relation of the pixel value to the amount of the received light. The processes performed by the linear processing section 130 may include, for example, darkness correction and defective pixel correction. The pixel value processed by the linear processing section 130 is supplied to the region identifying section 160, the correcting section 140 and the non-linear processing section 170.

The correcting section 140 corrects an image represented by the pixel values supplied from the linear processing section 130. For example, the correcting section 140 uses a plurality of pixel values supplied from the A/D converting section 125 and the optical transfer function of the lens system 110 in order to correct an image represented by the plurality of pixel values. In this way, the correcting section 140 corrects a plurality of pixel values that are linearly related to the amounts of light received the respective light receiving elements, according to the optical transfer function of the lens system 110.

The non-linear processing section 170 performs image processing on the image that has been corrected by the correcting section 140. The image processing operations performed by the non-linear processing section 170 may include, for example, a color balance operation, a γ correction operation, a coinciding operation, a contour correcting operation, and a color correcting operation. In this way, the non-linear processing section 170 converts a plurality of pixel values that have been corrected by the correcting section 140 into pixel values that are non-linearly related to the amounts of the light received by the respective light receiving elements.

As described above, the non-linear processing section 170 converts the pixel values representing the image that has been corrected by the correcting section 140 into values that are non-linearly related to the amounts of the light received by the light receiving elements. In other words, the correcting section 140 corrects an image according to the optical transfer function before the non-linear processing section 170 performs any operations. Therefore, the image capturing apparatus 100 can correctly restore an image of a subject.

The output section 150 outputs an output image that is obtained as a result of the operations performed by the correcting section 140 and the non-linear processing section 170. For example, the output section 150 may display the output image. As an alternative example, the output section 150 may record the output image onto a recording medium. As a further alternative example, the output section 150 may transmit the output image to a communication link. Here, the output section 150 may first compress the output image and then output the compressed image.

The region identifying section 160 identifies a partial region satisfying a predetermined condition in an image captured through the lens system 110. Specifically speaking, the condition storing section 180 stores a condition to be satisfied by a partial region that is to be corrected by the correcting section 140. The region identifying section 160 identifies, in an image, a partial region satisfying the condition stored on the condition storing section 180. The correcting section 140 then corrects an image shown by the partial region identified by the region identifying section 160, according to the optical transfer function of the lens system 110.

For example, the condition storing section 180 stores a condition related to a distance from the lens system 110 to a subject. Specifically speaking, the condition storing section 180 stores such a range for the distance from the lens system 110 to an object point that the lens system 110 has substantially the same optical transfer function for light from the object point. The region identifying section 160 identifies a partial region showing a subject that is located at a distance that falls within the distance range stored on the condition storing section 180. For example, the distance obtaining section 165 obtains the distance from the lens system 110 to an image-captured subject. The region identifying section 160 identifies a partial region showing a subject that is located at a distance, which is obtained by the distance obtaining section 165, that falls within the distance range stored on the condition storing section 180. In this manner, the region identifying section 160 identifies a partial region showing a subject that is located at a distance that satisfies the condition stored on the condition storing section 180.

As a different example, the condition storing section 180 may store a condition relating to brightness of an image obtained by irradiating a subject with illumination light, where the subject is located at a distance that falls within such a range of the distance from the lens system 110 to the object point that the lens system 110 has substantially the same optical transfer function for light from the object point. In this case, the region identifying section 160 may identify, in an image showing a subject irradiated with illumination light, a partial region with brightness satisfying the condition relating to brightness which is stored on the condition storing section 180.

As a further different example, the condition storing section 180 may store a condition relating to a type of a subject. In this case, the region identifying section 160 may identify a partial region showing a subject the type of which satisfies the condition relating to a type of a subject which is stored on the condition storing section 180. As a further different example, the condition storing section 180 may store a condition relating to a color of a subject. In this case, the region identifying section 160 may identify a partial region showing a subject satisfying the condition relating to a color of a subject which is stored on the condition storing section 180.

The region identifying section 160 identifies an overcorrected partial region in the image that has been corrected by the correcting section 140. Here, the overcorrected partial region indicates a partial region in which the optical response of the lens system 110 is overcorrected. Specifically speaking, the region identifying section 160 identifies, in the image that has been corrected by the correcting section 140, an overcorrected partial region, which is a partial region including a frequency range in which the optical response of the lens system 110 is corrected by more than a predetermined value. The correction control section 175 controls the intensity of the correction by the correcting section 140 in the overcorrected partial region identified by the region identifying section 160. With such a configuration, the image capturing apparatus 100 can prevent an image output by the output section 150 from including an artifact.

The parameter storing section 185 stores, in association with each of a plurality of different distance ranges, a correction parameter corresponding to the optical transfer function across the distance range. The correcting section 140 corrects the image of each partial region identified by the region identifying section 160 using the correction parameter stored in the parameter storing section in association with the distance range of the subject captured in the partial region.

The A/D converting section 125, the linear processing section 130, the correcting section 140, the non-linear processing section 170, the output section 150, the region identifying section 160, the distance obtaining section 165, the condition storing section 180, and the correction control section 175 can implement an image processing apparatus.

Figure 2:
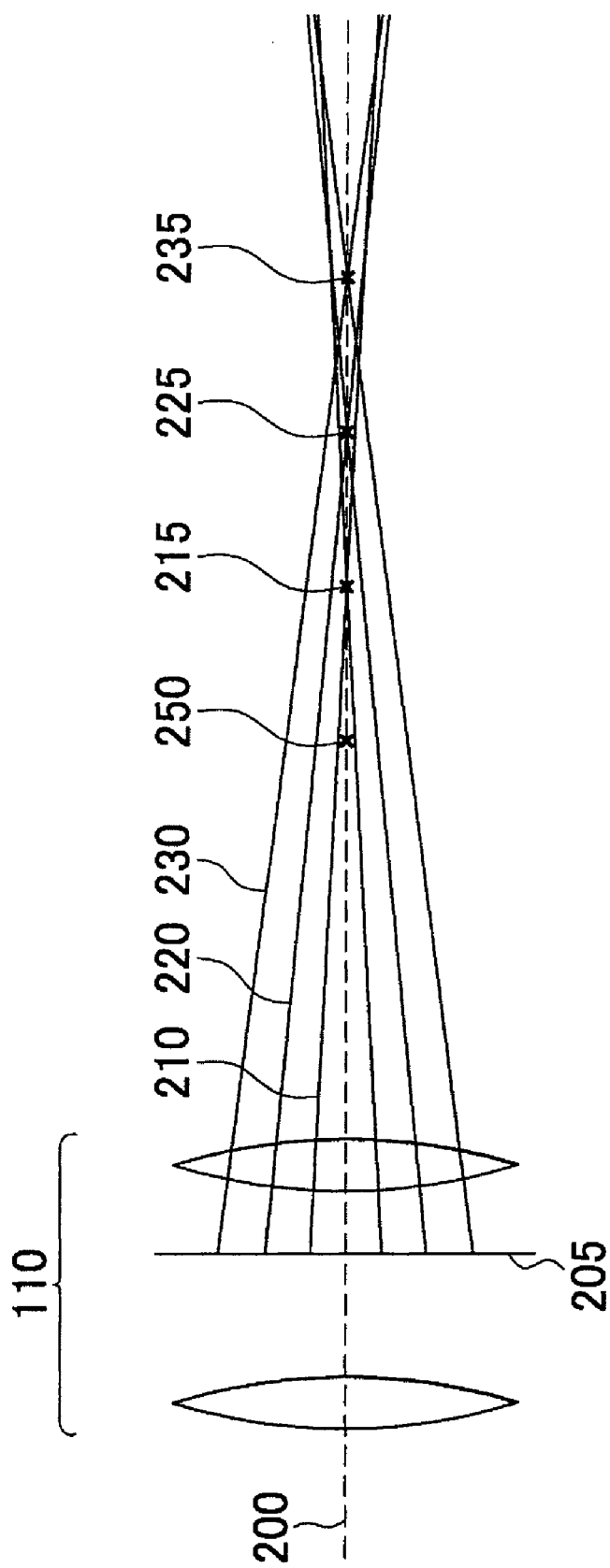
FIG. 2 schematically illustrates exemplary optical characteristics of a lens system 110.

FIG. 2 schematically illustrates exemplary optical characteristics of the lens system 110. FIG. 2 schematically shows the paths of a light ray 210, a light ray 220 and a light ray 230 that are incident on an entrance pupil 205 at different positions from an optical axis 200. Here, the light rays 210, 220 and 230 are some of the light rays that are incident on the lens system 110 from an object point on the optical axis 200. As shown in FIG. 2, the incident positions on the entrance pupil 205 of the light rays 210, 220 and 230 become more distant from the optical axis 200 in the stated order.

As shown in FIG. 2, with the help of the lens system 110, the light ray 210 crosses over the optical axis 200 at a position 215. The position 215 is positioned away from a position 250 of a paraxial focus in the direction of the optical axis 200 so as to be on the opposite side of the lens system 110. Also, with the help of the lens system 110, the light ray 230, which is incident at the most distant position from the optical axis 200, crosses over the optical axis 200 at a position 235. The position 235 is positioned away from the position 215 in the direction of the optical axis 200 so as to be on the opposite side of the lens system 110. With the help of the lens system 110, the light ray 220 crosses over the optical axis 200 at a position 225 that is between the positions 215 and 235.

As shown in FIG. 2, spread of light caused by the lens system 110 is expected to have substantially the same size within an interval between the position 215 and the position 235. Thus, the lens system 110 has overcorrected spherical aberration and focuses light at a position substantially further than the position 250 of the paraxial focus. Accordingly, the lens system 110 can increase an interval in the optical axis direction within which light from an object point has spread of substantially the same size irrespective of an image plane position in the optical axis direction, when compared with the case where the spherical aberration is not overcorrected.

Such an increase in the interval in the optical axis direction results in an increase in the range for the distance between the lens system 110 and such an object point that light from the object point has spread of substantially the same size. For the widened range, one image plane position can be determined. By disposing the light receiving section 120 at such an image plane position, substantially the same optical transfer function is achieved at the position of the light receiving section 120 irrespective of the distance between the object point and the lens system 110. In this way, the above-described aberration characteristics of the lens system 110 can achieve substantially the same optical transfer function for light from an object point irrespective of the distance between the object point and the lens system 110.

In the above, the optical characteristics of the lens system 110 are qualitatively described with reference to FIG. 2. Here, note that the schematic illustration of the lens system 110 shown in FIG. 2 is provided only in order to qualitatively explain the optical characteristics of the lens system 110 and does not reflect the real dimensions.

Figure 3:
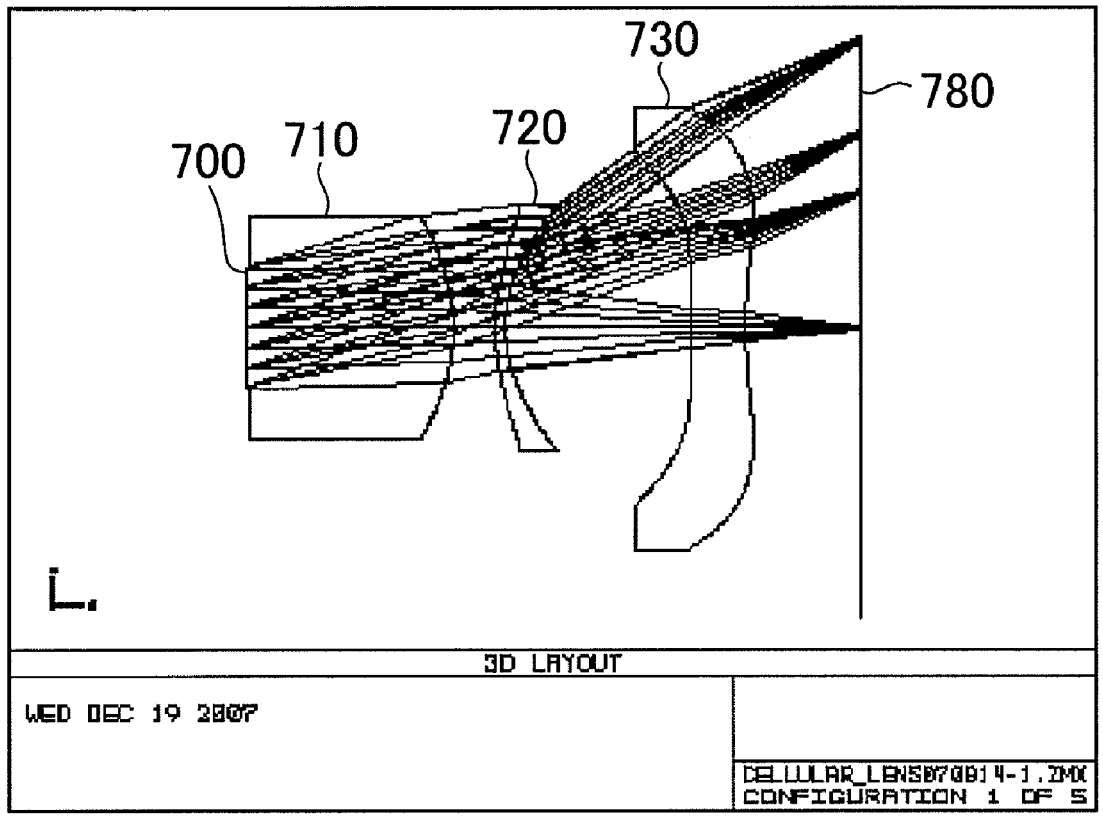
FIG. 3 illustrates an exemplary configuration of the lens system 110.

FIG. 3 illustrates an exemplary configuration of the lens system 110. The lens system 110 includes a diaphragm 700, a lens 710, a lens 720, and a lens 730. A reference numeral 780 designates an image plane. In FIG. 3, a plurality of light rays overlap the lens system 110. The following explains the arrangement and optical characteristics of the lenses 710, 720 and 730.

The refractive index of the lenses 710 and 730 takes values of 1.53128710, 1.52470166 and 1.52196091 for light having wavelengths of 486.133 nm, 587.562 nm and 656.273 nm.

The refractive index of the lens 720 takes values of 1.59943869, 1.58546992, and 1.57986377 for light having wavelengths of 486.133 nm, 587.562 nm, and 656.273 nm. The diaphragm 700 is spaced away from the vertex of the lens 710 by a distance of 0.001566661 mm so as to be positioned between the vertex of the lens 710 and the image plane.

The lens 710 has a thickness of 1.987091 mm. In the explanation of FIG. 3, the term "thickness" denotes the length of a lens in the optical axis direction. Referring to a surface of the lens 710 that faces an object, the radius of curvature is 15.48676 mm, the radius of the cross section is 1.188941 mm, and the conical constant is −90378.4. Referring to a surface of the lens 710 that faces an image, the radius of curvature is −12.09038 mm, the radius of the cross section is 2.14803 mm, and the conical constant is 28.79374. In the explanation of FIG. 3, when a surface has a negative radius of curvature, the surface is shaped as a concave surface for light.

The lens 720 is spaced away from the lens 710 by a distance of 0.4005282 mm so as to be positioned between the lens 710 and the image plane. In the explanation of FIG. 3, a distance between lenses denotes a distance, on an optical axis, between an image-plane-side surface of one of the lenses that is closer to an object and an object-side surface of the other lens that is closer to an image plane. The lens 720 has a thickness of 0.09214797 mm. Referring to a surface of the lens 720 that faces the object, the radius of curvature is 2.114035 mm, the radius of cross section is 2.38122 mm, and the conical constant is −0.3929276. Referring to a surface of the lens 720 that faces the image, the radius of curvature is 1.119414 mm, the radius of cross section is 2.362124 mm, and the conical constant is −2.780465.

The lens 730 is spaced away from the lens 720 by a distance of 1.770789 mm so as to be positioned between the lens 720 and the image plane. The lens 730 has a thickness of 0.5204438 mm. Referring to a surface of the lens 730 that faces the object, the radius of curvature is −0.6002893 mm, the radius of cross section is 3.486572 mm, and the conical constant is −958.9289. Referring to a surface of the lens 730 that faces the image, the radius of curvature is −0.3018179 mm, the radius of cross section is 4.262504 mm, and the conical constant is −465.3071. The image plane is positioned away from the lens 730 by a distance of 1.1 mm.

As stated above, the lenses 710, 720 and 730 are coaxially arranged with their central axes being aligned to each other. Therefore, the lens system 110 is rotationally symmetrical with respect to the optical axis.

The absolute value of the difference between the angle of the normal of the image plane and the angle at which a main light ray is incident on the image plane is set smaller than a predetermined value so that a calculation error of the optical transfer function of the lens system 110 is made smaller than a predetermined value. As stated, the calculation error of the optical transfer function can be reduced by increasing the telecentric characteristics of the lens system 110. For example, an MTF can be calculated with a sufficiently small error by means of FFT. Therefore, the image capturing apparatus 100 can restore at a high speed an image that is blurred by the lens system 110.

FIG. 4 illustrates the aberration characteristics of the lens system 110 shown in FIG. 3. FIG. 4 includes, beginning at the top, a diagram showing the spherical aberration, diagrams showing the astigmatism and the distortion aberration, and diagrams showing the transverse aberration. As seen from the top drawing showing the spherical aberration, the spherical aberration of the lens system 110 shown in FIG. 3 is overcorrected. In this diagram showing the spherical aberration, the horizontal axis represents a position relative to a defined image plane, not a position relative to a paraxial focus.

As seen from the diagram, the longitudinal aberration takes positive values across the entire image plane. In other words, the longitudinal aberration takes positive values at least for light that is incident on the entrance pupil of the lens system 110 at a position that falls within a range between a first incident position and the optical axis, where the first incident position is spaced away from the optical axis by a first distance.

At the bottom, FIG. 4 has diagrams showing the transverse aberration in association with a plurality of image heights. The upper left diagram shows the transverse aberration on the optical axis, the upper right diagram shows the transverse aberration at an image height of 14.10 mm, the lower left diagram shows the transverse aberration at an image height of 19.74 mm, and the lower right diagram shows the transverse aberration at an image height of 28.20 mm. As seen from these diagrams, the transverse aberration of the lens system 110 is shaped in substantially the same manner for each of the image heights.

FIG. 5 illustrates the optical transfer characteristics of the lens system 110 shown in FIG. 3. FIG. 5 includes, beginning at the top, a diagram showing how spot diagrams are dependent on image heights and defocus amounts, a diagram showing how the MTF is dependent on defocus amounts, and a diagram showing spatial frequency characteristics of the MTF.

The top drawing shows spot diagrams obtained for different image heights and different defocus amounts. In this diagram, a plurality of spot diagrams for the same image height and for different defocus amounts are arranged next to each other in the horizontal direction. Also, a plurality of spot diagrams for the same defocus amount and for different image heights are arranged next to each other in the vertical direction.

Numerical values written on the left side of the spot diagrams denote image heights. As indicated by these numerical values, the top drawing includes spot diagrams obtained with the image height from the optical axis being set to zero (i.e., on the optical axis), 14.10 mm, 19.74 mm, and 20.20 mm. Numerical values written under the spot diagrams denote defocus amounts. As indicated by these numerical values, the top drawing includes spot diagrams obtained at a position spaced away from a defined image plane by −75 μm, at a position spaced away from the image plane by −37.5 μm, at a position of the image plane, at a position spaced away from the image plane by 37.5 μm, and at a position spaced away from the image plane by 75 μm.

The top drawing in FIG. 5 indicates that the spot diagrams have substantially the same spread for image planes differently positioned in the optical axis direction at least within a predetermined range, irrespective of the image heights. Thus, spread of light from an object point caused by the lens system 110 is substantially the same at image plane positions that are different from each other in the optical axis direction within a predetermined range. Here, spread of light may denote spread of a spot diagram as referred to in FIG. 5 or spread of light represented by a point image distribution function. As described above, spread of light from an object point caused by the lens system 110 is substantially the same irrespective of the image heights, and spread of light from an object point caused by the lens system 110 is substantially the same at image plane positions different from each other in the optical axis direction at least within a predetermined range.

As seen from the middle diagram showing how the MTF is dependent on defocus amounts, substantially the same MTF value distributions are obtained for different image heights irrespective of whether a light ray is a sagittal ray or meridional ray. The MTF takes substantially the same value at least within a certain range of defocus amounts that is shown in FIG. 5. In this way, the MTF of the lens system 110 takes substantially the same value for a wide range of defocus amounts.

As seen from the bottom diagram showing the spatial frequency characteristic of the MTF, the lens system 110 has substantially the same MTF-frequency characteristics for different image heights, irrespective of whether a light ray is a sagittal ray or meridional ray. In other words, the MTF of the lens system 110 is substantially the same irrespective of the image heights. Furthermore, the MTF of the lens system 110 is substantially the same across image plane positions different from each other in the optical axis direction within a predetermined range. As described above, the lens system 110 spreads light from an object point to have substantially the same size at the light receiving section 120 irrespective of the distance between the object point and the lens system 110, so that the lens system 110 has substantially the same optical transfer function for light from an object point irrespective of the distance between the object point and the lens system 110.

Figure 6:
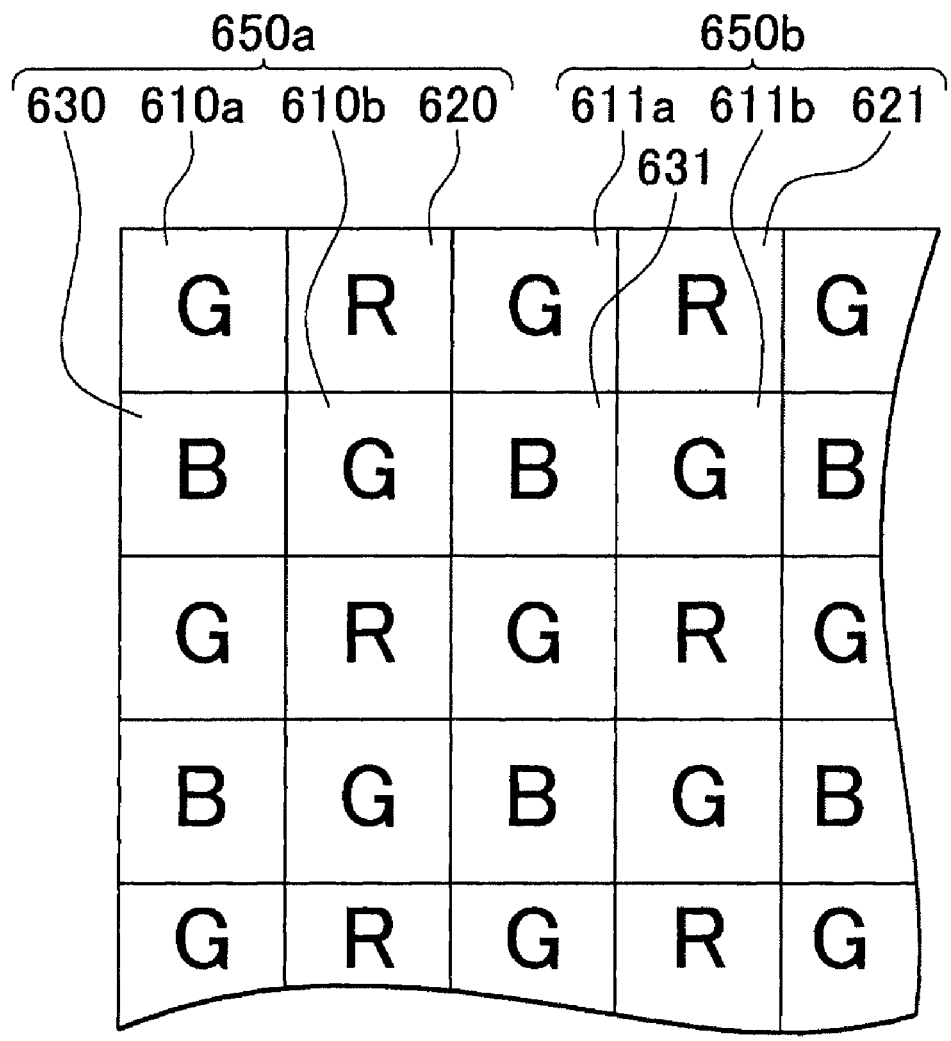
FIG. 6 illustrates exemplary arrangement of light receiving elements included in a light receiving section 120.

FIG. 6 illustrates exemplary arrangement of the light receiving elements included in the light receiving section 120. The light receiving section 120 includes a light receiving element unit 650a constituted by light receiving elements 610a and 610b receiving light of the G component, a light receiving element 620 receiving light of the R component, and a light receiving element 630 receiving light of the B component. The light receiving section 120 is formed by two-dimensionally arranging a plurality of light receiving element units each of which has light receiving elements arranged in the same manner as in the light receiving element unit 650a, for example, a light receiving element unit 650b constituted by light receiving elements 611a and 611b receiving light of the G component, a light receiving element 621 receiving light of the R component, and a light receiving element 631 receiving light of the B component.

As described above, the light receiving section 120 has a plurality of light receiving elements each of which is configured to receive light of one of a plurality of color components. The light receiving elements form a substantially planar light receiving surface in the light receiving section 120. The light receiving surface of the light receiving section 120 is set substantially perpendicular to the optical axis of the lens system 110. Here, the light receiving elements may be CCD or MOS imaging elements.

Here, spread of light from an object point caused by the lens system 110 is set to be larger than the pitch of the light receiving elements included in the light receiving section 120, at a position of the light receiving section 120. The pitch of the light receiving elements herein denotes the pitch of light receiving elements configured to receive light in a wavelength range representing the same color component. For example, the pitch of the light receiving elements may denote the distance between the position of the light receiving element 620 and the position of the light receiving element 621. Therefore, the lens system 110 spreads light from an object point so that two or more of the light receiving elements receive the light.

In this case, light from an object point is received by the light receiving elements after passing through the lens system 110. Therefore, an image of a subject becomes blurry. If the optical transfer function of the lens system 110 is known, however, the image of the subject can be restored with the help of image processing designed for correcting the spread caused by the lens system 110, which is implied by the optical transfer function.

For example, it is assumed that spread of light from an object point caused by the lens system 110 covers a predetermined number of light receiving elements at the position of the light receiving section 120. In this case, the correcting section 140 can correct an image based on the amounts of light received by the predetermined number of light receiving elements and the optical transfer function of the lens system 110. More particularly, the correcting section 140 can restore the image of the subject to a clear image by performing deconvolution with the use of an inverse filter designed to correct the optical response of the lens system 110, with reference to the amounts of light received by the predetermined number of light receiving elements (for example, light receiving elements arranged in 3×3, 7×7 or the like).

As described above, the correcting section 140 corrects a plurality of pixel values in accordance with two or more of the pixel values and the optical transfer function, in order to reduce the influence, on the pixel values, of the spread of the light from the object point caused by the lens system 110. Here, the correcting section 140 corrects the pixel values differently according to their color components, in accordance with optical transfer functions of the lens system 110 for light of the respective color components. In other words, the correcting section 140 can appropriately correct influence of spread of light, which may differ depending on different optical transfer functions of different wavelengths.

Figure 7:
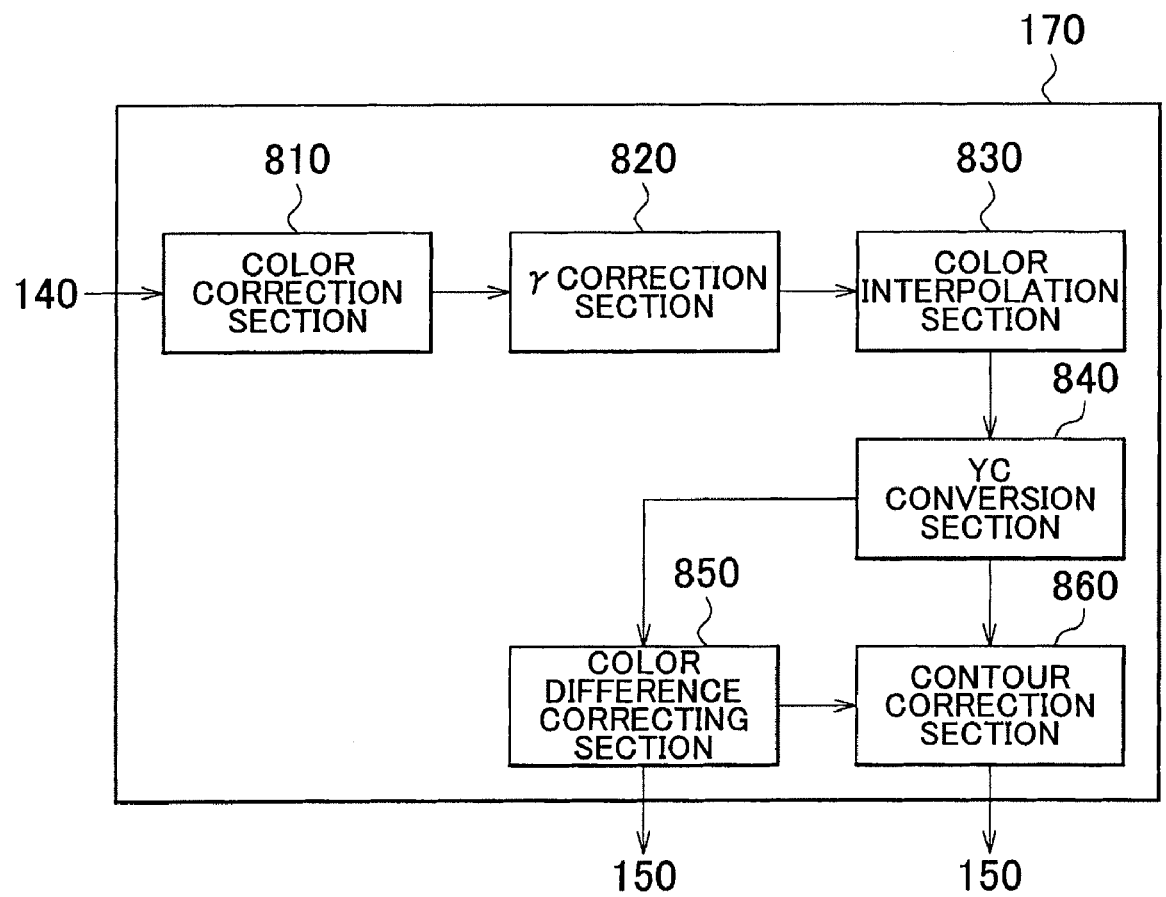
FIG. 7 illustrates an exemplary block configuration of a non-linear processing section 170.

FIG. 7 illustrates an exemplary block configuration of the non-linear processing section 170. The non-linear processing section 170 includes a color correction section 810, a γ correction section 820, a color interpolation section 830, a YC conversion section 840, a color difference correction section 850, and a contour correction section 860.

The color correction section 810 obtains, from the correcting section 140, pixel values that have been corrected by the correcting section 140. The color correction section 810 performs gain correction and color correction on the pixel values obtained from the correcting section 140 by using matrix processing. For example, the color correction section 810 performs gain adjustment on the pixel values obtained from the correcting section 140, which represent the intensity levels of the R, G and B components.

For example, the color correction section 810 may multiply the pixel values of the respective color components by gain values individually determined for the color components. As an alternative example, the color correction section 810 may convert the pixel values of the respective color components into values expressed as a sum of pixel values of the respective color components multiplied by predetermined coefficients individually determined for the color components. For example, the color correction section 810 converts a pixel value of the R component into a value expressed as $u_R \times R + u_G \times G + u_B \times B$, where R, G and B respectively denote values of the R, G and B component. The values of $u_R$, $u_G$ and $u_B$ may be differently set depending on the color components of the pixel values to be output. In this manner, the color correction section 810 may correct colors based on matrix processing. In the above-described manner, the color correction section 810 performs color balance correction on an image represented by the pixel values that have been corrected by the correcting section 140.

The pixel values that have been subjected to the color correction by the color correction section 810 are supplied to the γ correction section 820. The γ correction section 820 performs γ correction on the pixel values supplied from the color correction section 810. The γ correction can also convert the pixel values into values that are non-linearly related to the amounts of the received light. Here, the γ correction may involve changing the dynamic range. Thus, the γ correction section 820 may convert the corrected pixel values into pixel values having a different dynamic range.

The pixel values that have been subjected to the γ correction by the γ correction section 820 are supplied to the color interpolation section 830. The color interpolation section 830 performs a coinciding operation on the pixel values that have been corrected by the color correction section 810 and converted by the γ correction section 820. Specifically speaking, the color interpolation section 830 performs color interpolation, thereby determining pixel values of all the color components in association with the position of each light receiving element. For example, in the case of the light receiving element arrangement shown in FIG. 6, light of the G and B components is not received at the position of the light receiving element 620. Accordingly, no pixel values are determined for the G and B components in association with the position of the light receiving element 620.

Therefore, the color interpolation section 830 performs interpolation based on pixel values associated with the positions in the vicinity of the position of the light receiving element 620 (for example, the pixel value of the G component associated with the position of the light receiving element 610a and the pixel value of the G component associated with the position of the light receiving element 611a), to calculate a pixel value associated with the position of the light receiving element 620. The color interpolation section 830 can calculate a pixel value of the B component in a similar manner. In association with the remaining positions, the color interpolation section 830 can similarly calculate pixel values of color components the light of which is not received.

In the above-described manner, the color interpolation section 830 performs interpolation on pixel values that have been corrected by the correcting section 140, by using the pixel values that have been corrected. As previously described, the correcting section 140 corrects a plurality of pixel values differently depending on their color components, based on the optical transfer functions of the lens system 110 for light of the individual color components. With such a configuration, the image capturing apparatus 100 can correct influence on pixel values that may differ depending on different optical transfer functions for different wavelengths, before the color interpolation section 830 performs color interpolation.

The YC conversion section 840 calculates a luminance signal and a color difference signal based on the R, G and B values obtained as a result of the interpolation performed by the color interpolation section 830. The luminance signal calculated by the YC conversion section 840 is supplied to the contour correction section 860 so that the contour correction section 860 performs contour correction on the luminance signal. Here, the operations performed by the contour correction section 860 can include edge enhancement. As stated, the contour correction section 860 subjects an image represented by the pixel values that have been corrected by the correcting section 140 to spatial frequency processing that modulates the spatial frequency components of the image. On the other hand, the color difference signal is supplied to the color difference correction section 850, so that the color difference correction section 850 performs color difference correction, such as tonality correction, on the color different signal. Here, the color difference correction performed by the color difference correction section 850 can include color enhancement.

As described above, the non-linear processing section 170 converts the pixel values into values that are non-linearly related to the amounts of the received light. The correcting section 140 can perform correction with the use of an inverse filter based on an optical transfer function and the like before the non-linear processing section 170 performs non-linear processing, that is to say, when the pixel values are still linearly related to the amounts of the received light. As a consequence, the image capturing apparatus 100 can restore an image of a subject more accurately.

FIG. 8 illustrates exemplary data stored on the condition storing section 180 by using a table. The condition storing section 180 stores a range for the distance between the lens system 110 and a subject (DISTANCE D1 to DISTANCE D2), a range for the luminance of the subject (LUMINANCE I1 to LUMINANCE I2), a shape characteristic amount that is a characteristic amount of the shape of the subject, and a color characteristic amount that is a characteristic amount of the color of the subject. Here, the condition storing section 180 may store a plurality of shape characteristic amounts and a plurality of color characteristic amounts. A color characteristic amount used to detect a barcode region can be exemplified by a ratio among white, black and gray values, and a shape characteristic amount used to detect a two-dimensional barcode region can be exemplified by a lattice-like texture pattern. Here, even if an image includes a blurry section created by the lens system 110, sufficient texture information can be extracted as long as the blurry section corresponds only to a few pixels.

The region identifying section 160 identifies a partial region including a subject satisfying a condition stored on the condition storing section 180. Specifically speaking, the region identifying section 160 identifies a partial region including a subject positioned at a distance that falls within the range of DISTANCE D1 to DISTANCE D2, a subject whose luminance falls within the range of LUMINANCE I1 to LUMINANCE I2, a subject having the above shape characteristic amount or a subject having the above color characteristic amount.

Figure 9:
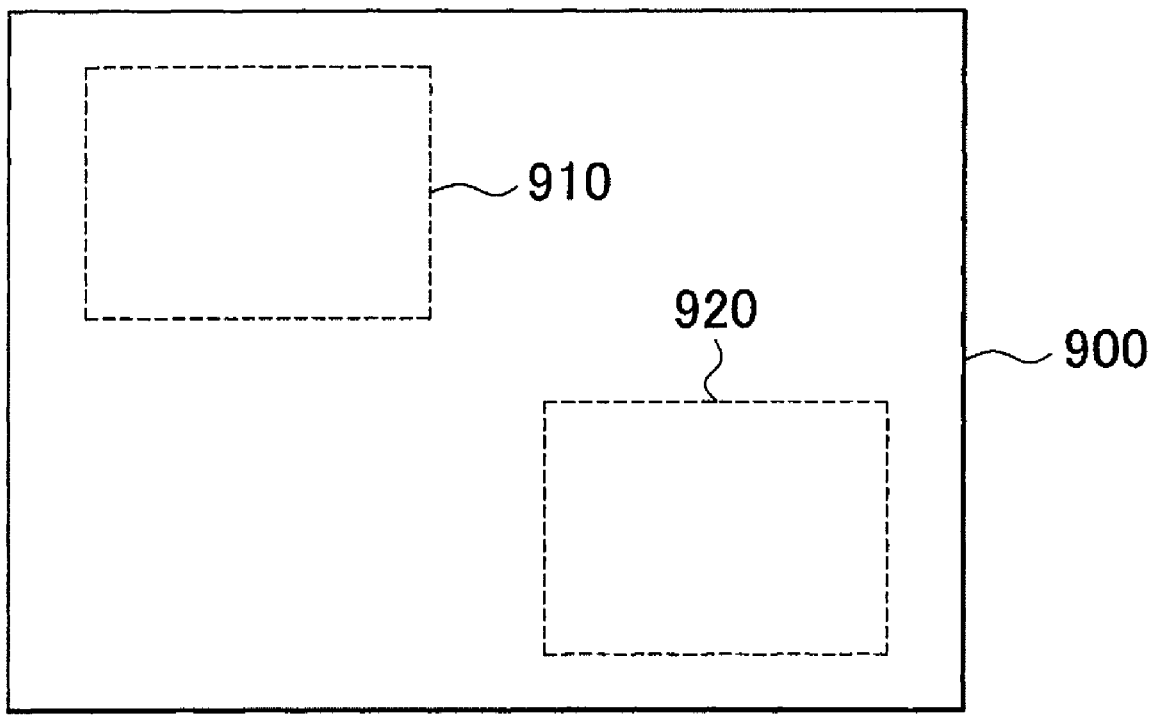
FIG. 9 illustrates exemplary partial regions identified by a region identifying section 160.

FIG. 9 illustrates exemplary partial regions identified by the region identifying section 160. It is assumed that the region identifying section 160 identifies partial regions 910 and 920 in an image 900 as partial regions satisfying a condition stored on the condition storing section 180. In this case, the correcting section 140 corrects the partial regions 910 and 920 identified by the region identifying section 160, in accordance with the optical characteristics of the lens system 110, which are indicated by optical transfer functions for the respective partial regions. With such a configuration, even when different optical transfer function are associated with different image heights, the correcting section 140 can perform appropriate correction according to image heights.

Here, the distance range of DISTANCE D1 to DISTANCE D2, which is stored on the condition storing section 180, is defined as follows. When the distance from the lens system 110 to a given object point falls within the distance range of DISTANCE D1 to DISTANCE D2, the lens system 110 may have a substantially constant optical transfer function for light from the given object point, as described above. In this case, the correcting section 140 corrects a partial region of a substantially constant optical transfer function, but does not correct other partial regions. In this manner, the image capturing apparatus 100 can prevent artifacts from being generated because of correction that is performed by using an inverse filter designed for optical response different from actual optical response.

Similar effects as above can be produced when the correcting section 140 is configured to correct a partial region whose luminance falls within the range of LUMINANCE I1 to LUMINANCE I2. This configuration is particularly advantageous when the image capturing apparatus 100 captures an image of a subject in the vicinity thereof under illumination light, for example, when the image capturing apparatus 100 is an image capturing device used in an endoscope system. Also, being configured to correct a partial region having a shape characteristic amount or color characteristic amount that is stored on the condition storing section 180, the correcting section 140 can correct a partial region showing a subject desired to be observed. Since the correcting section 140 is configured to correct particular partial regions and not to correct other partial regions, the image capturing apparatus 100 can shorten a time period required for computation relating to the correction.

Figure 10:
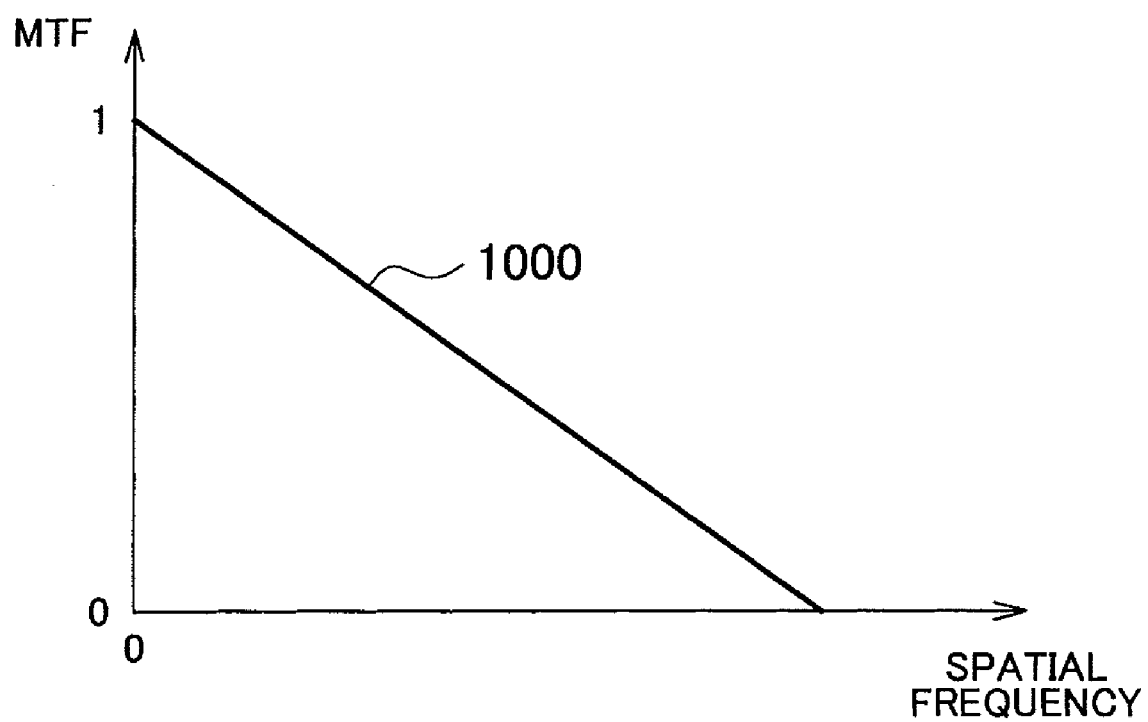
FIG. 10 illustrates diffraction limited MTF of the lens system 110.

FIG. 10 illustrates diffraction limited MTF of the lens system 110. A line 1000 indicates diffraction limited MTF characteristics. Here, correction of optical response performed by the correcting section 140 by using an inverse filter or the like as described above is equivalent to bringing the MTF characteristics of the entire system including the lens system 110 and the correction by the correcting section 140 closer to the diffraction limited MTF characteristics.

Figure 11:
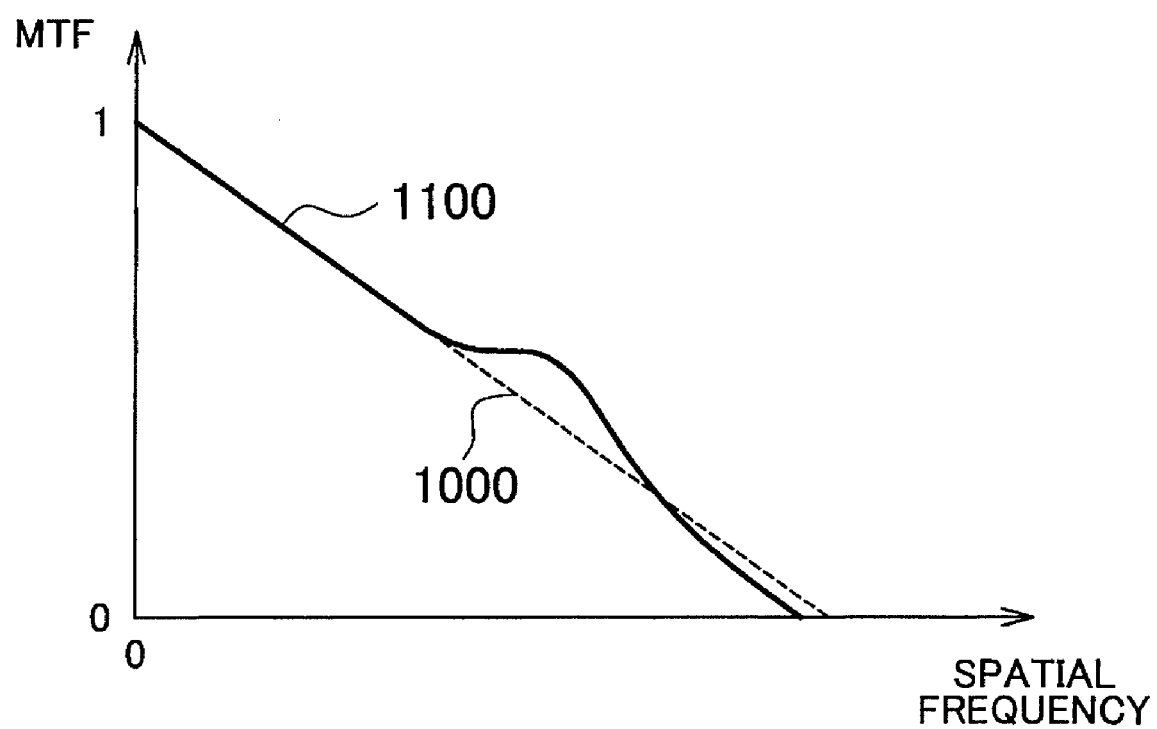
FIG. 11 illustrates MTF characteristics corrected by the correcting section 140.

FIG. 11 illustrates MTF characteristics obtained as a result of correction by the correcting section 140. A line 1100 indicates MTF characteristics of the entire system resulting from correction of an image performed by the correcting section 140 using a certain inverse filter. As seen from FIG. 11, the MTF characteristics of the entire system are displaced from the diffraction limited MTF characteristics (indicated by a dotted line 1000). This displacement may be generated when the correcting section 140 performs the correction by using an inverse filter designed for an optical transfer function different from an actual optical transfer function. When such displacement is generated in a spatial frequency range to which human eyes are highly sensitive, a corrected image is unpleasant for human eyes.

For this reason, the region identifying section 160 identifies a partial region in which the MTF characteristics are displaced from the diffraction limited MTF characteristics in a particular spatial frequency range. For example, the region identifying section 160 may identify a partial region in which an artifact is generated, in an image resulting from the correction by the correcting section 140. In order to identify a partial region with an image pattern caused by the optical transfer function varying depending on image heights, the region identifying section 160 can identify such a partial region with reference to an optical transfer function of each partial region and a gain for each frequency range generated by the inverse filter. The correction control section 175 then prohibits the correcting section 140 from correcting the partial region identified by the region identifying section 160, or reduces a gain in the particular frequency range in the partial region identified by the region identifying section 160. In the above-described manner, the image capturing apparatus 100 can suppress artifacts that may be generated by the correction performed by the correcting section 140.

Figure 12:
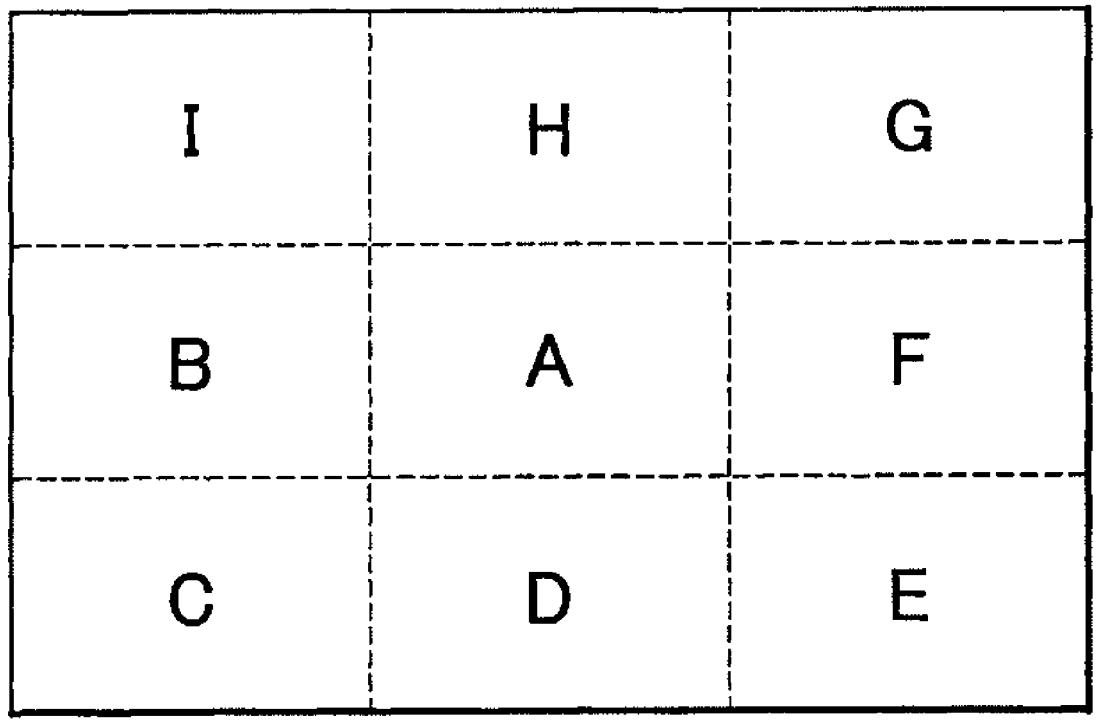
FIG. 12 shows an example of a plurality of image regions in a final image.

FIG. 12 shows an example of a plurality of image regions in a final image. The image region A is a central image region in the captured image, and image regions B to I are the image regions surrounding the image region A. The subject near the optical axis of the lens system 110 is captured in the image region A. The condition storing section 180 stores, for each image region A to I, conditions relating to a distance range of a subject captured in each region. The parameter storing section 185 stores, for each image region image A to I, a correction parameter that is used by the correcting section 140 when correcting each image region.

Figure 13:
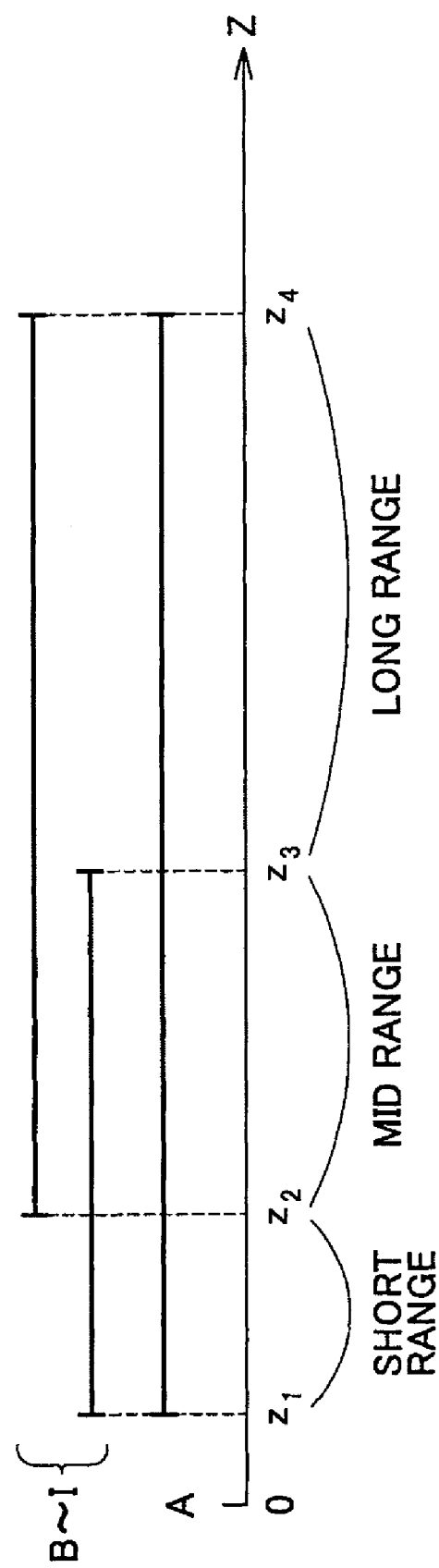
FIG. 13 schematically shows an example of distance ranges indicating positions where a subject exists whose image can be corrected.

FIG. 13 schematically shows an example of distance ranges indicating positions where a subject exists whose image can be corrected by the correcting section 140. When the distance from the lens system 110 is represented by z, the condition storing section 180 stores, as a condition for identifying the image region A as the partial region to be corrected, a condition indicating that the distance from the lens system 110 to each subject is between z1 and z4. Furthermore, the condition storing section 180 stores, as a condition for identifying the image regions B to I as the partial regions to be corrected, a condition indicating that the distance from the lens system 110 to each subject is between z1 and z3 or between z2 and z4.

The region identifying section 160 determines, for each image region, whether the distance to each subject being captured is within the distance range stored by the condition storing section 180 in association with the image region. The region identifying section 160 then identifies the partial regions to be corrected by the correcting section 140 as the image regions in which the distance to each subject is within the distance range.

In this way, the condition storing section 180 stores a condition relating to the distance range for each image region. The region identifying section 160 identifies, for each image region, partial regions that fulfill the condition stored by the condition storing section 180 for the image region.

The parameter storing section 185 stores, for each image region A to I, a correction parameter in association with a range of distances to the subjects being captured in the image region. The correcting section 140 corrects the image of each image region identified by the region identifying section 160, using the correction parameter stored by the parameter storing section 185 in association with the range of distances to the subjects being captured.

FIG. 14 shows an exemplary table of information stored by the condition storing section 180 and the parameter storing section 185. For ease of explanation, the following description refers to the distance between z0 and z1 as "short range," the distance between z1 and z2 as "mid range," and the distance between z2 and z3 as "long range."

The condition storing section 180 stores, as the distance range to be corrected for the image region A, all combinations of the short range, the mid range, and the long range. The condition storing section 180 stores, as the distance range to be corrected for the image region B, the short range, the mid range, the long range, a combination of the short and mid ranges, and a combination of the mid and long ranges. In the same way, the condition storing section 180 stores, as the distance range to be corrected for the image regions C to I, the short range, the mid range, the long range, a combination of the short and mid ranges, and a combination of the mid and long ranges.

The parameter storing section 185 stores, for the image region A, correction parameters A1 to A6 in association with each of the possible combinations of the short, mid, and long ranges indicating the distance ranges to be corrected. For the image region B, the parameter storing section 185 stores correction parameters B1 to B5 in association with each of the short, mid, and long ranges, the combination of the short and mid ranges, and the combination of the mid and long ranges indicating the distance ranges to be corrected. In the same way, for each of the image regions C to I, the parameter storing section 185 stores 5 correction parameters in association with the short, mid, and long ranges, the combination of the short and mid ranges, and the combination of the mid and long ranges indicating the distance ranges to be corrected.

Figure 15:
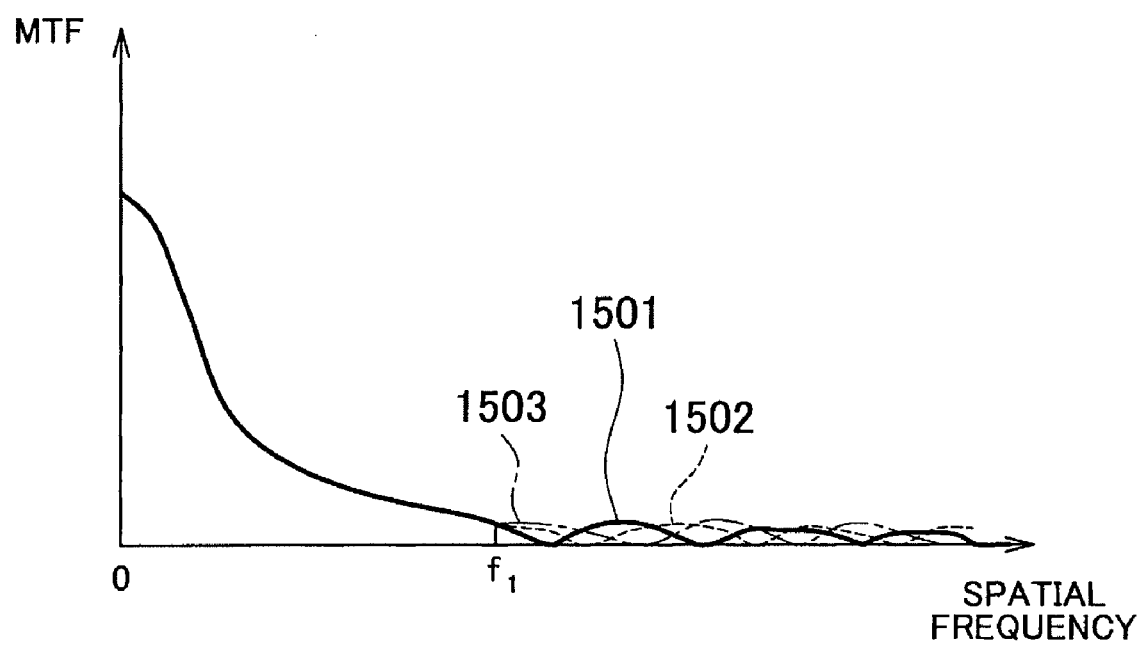
FIG. 15 shows examples of spatial frequency dependencies of MTFs.

FIG. 15 shows examples of spatial frequency dependencies of MTFs. The MTF 1501 represents an MTF for light that focuses at a prescribed position on an image surface at a distance z1 from the lens system 110. The MTF 1503 represents an MTF for light that focuses at the prescribed position on an image surface at a distance z2 from the lens system 110. The MTF 1502 represents an MTF for light that focuses at the prescribed position on an image surface at a distance between z1 and z2 from the lens system 110.

As shown in FIG. 15, each MTF is substantially the same in the spatial frequency band from DC to the spatial frequency f1. When the MTFs for the light focusing at an image region near the prescribed position are substantially the same in the distance range from z1 to z2, the image of a subject existing between z1 and z2 can be restored as a clear image by a restoration filter that is the same over the spatial frequency band from DC to the spatial frequency f1. In this case, the restoration intensity of the restoration filter in a spatial frequency band higher than the spatial frequency f1 should be set to substantially zero or to a value such that a difference in relation to an equivalent MTF after restoration is small enough to be ignored. When the correcting section 140 performs the restoration using such a restoration filter, an equivalent restored MTF can be very near the MTF at an analytical limit in the spatial frequency band from DC to the spatial frequency f1. Furthermore, since the difference relative to a restored equivalent MTF is small enough to be ignored in the spatial frequency band higher than the spatial frequency f1, the artifacts caused by the restoration process can sometimes be suppressed.

The above describes performing the restoration using the same filter for the image of each subject in the short range. In the same way, a spatial frequency range in which the same filter can be used to restore a clear image is determined for each of the mid range, the long range, the combination of the short and mid ranges, the combination of the mid and long ranges, and the combination of the short, mid, and long ranges. Accordingly, the parameter storing section 185 may store, in association with each of the distance ranges, a restoration filter that restores subject images in a spatial frequency region having a substantially uniform optical transfer function. The parameter storing section 185 may store these restoration filters for each of the image regions. The correcting section 140 restores each of the image regions A to I using the restoration filters stored by the parameter storing section 185 in association with range of distances to the subjects being captured in the image region.

In this way, the parameter storing section 185 stores correction parameters that correct the images in spatial frequency regions in which the optical transfer function is substantially uniform over each of a plurality of different distance ranges, according to the optical transfer function associated with each distance range. The correcting section 140 corrects the image of each partial region identified by the region identifying section 160, using the correction parameters stored by the parameter storing section 185 in association with the range of distances to the subjects being captured in the partial region. This correction can achieve subject images that are free of artifacts.

Figure 16:
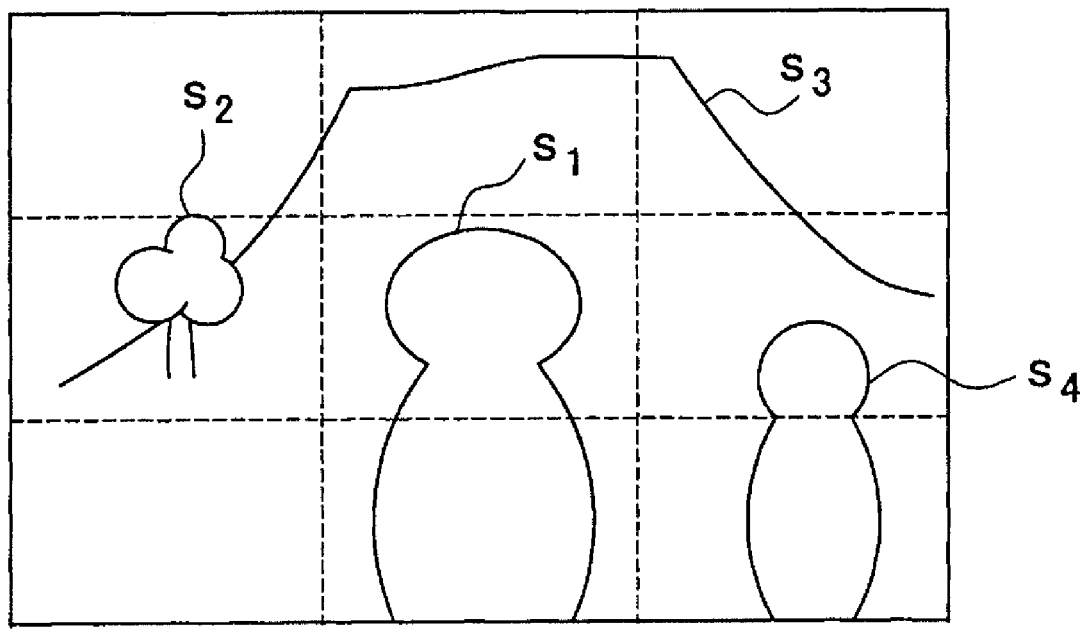
FIG. 16 shows an exemplary captured image.

FIG. 16 shows an exemplary captured image. As shown in FIG. 16, the image regions A and D in the captured image mainly include an image of a subject s1. The image region B mainly includes an image of a subject s2 and a portion of a subject s3. The image region E includes an image of a portion of a subject s4. The image region F includes an image of a portion of the subject s3 and an image of a portion of the subject s4.

FIG. 17 shows a positional relation between the image capturing apparatus 100 and the subjects s1 to s4 included in the captured image 900, along with a face angle of the image capturing apparatus 100. As shown in FIG. 17, the subject s1 and the subject s4 are in the short range distance, the subject s2 is in the mid range distance, and the subject s3 is in the long range distance.

The majority of the image region A and the image region D is occupied by the subject s1 in the short range distance. Accordingly, the region identifying section 160 identifies the image regions A and D as partial regions to be corrected by the correcting section 140. The correcting section 140 determines the correction parameters for correcting the image regions A and D to be (i) the short range filter A1 stored by the parameter storing section 185 in association with the short range distance and the image region A and (ii) the short range filter stored by the parameter storing section 185 in association with the short range distance and the image region D, respectively.

The image region B is occupied by the subjects s2 and s3, which are in the combination of the mid range and the long range distances. Accordingly, the region identifying section 160 identifies the image region B as the partial region to be corrected by the correcting section 140. The correcting section 140 determines the correction parameters for correcting the image region B to be the mid and long range filter B5 corresponding to the combination of the mid and long ranges in which the subjects s2 and s3 are present.

The image region F includes images of the subjects s3 and s4. The distance range of the subjects being captured in the image region F spans from short range to long range. As described above, the distance range spanning from short range to long range does not fulfill the condition stored by the condition storing section 180 in association with the image region F. Accordingly, the image region F is not identified by the region identifying section 160 as a partial region to be corrected, and therefore the correcting section 140 does not apply the correction process to the image region F.

The image of the subject s4 is included in the image region E. Since the image region F is not identified as a partial region to be corrected, the region identifying section 160 also does not identify the image region E that contains the same subject s4 as a partial region to be corrected. Therefore, even when a subject included in an image region that is not identified as a partial region to be corrected by the correcting section 140 is included in a different image region, the region identifying section 160 need not identify the other image region as a partial region to be corrected by the correcting section 140. As a result, there is a decreased chance of a corrected region and an uncorrected region being mixed for images of the same subject.

The region identifying section 160 may identify whether certain images are of the same subject by determining whether the images have the same color distributions. In this way, the region identifying section 160 can determine the subjects are the same from even a blurred subject image.

The image region C, in which there is only a subject at short range, is identified by the region identifying section 160 as a partial region to be corrected and is corrected by the correcting section 140 using the short range filter. The image regions G, H, and I, in which there is only a subject at long range, are identified by the region identifying section 160 as partial regions to be corrected and are corrected by the correcting section 140 using the long range filter.

As described above, the condition storing section 180 stores conditions relating to the distance range from the lens system 110 to the subjects being captured in each image region. The region identifying section 160 then identifies partial regions in which the distance range from the lens system 110 to the subjects being captured in each image region fulfills the condition relating to the corresponding distance range stored by the condition storing section 180. If the distances to subjects being captured span a wide distance range, restoration using the same restoration filter might cause an artifact in the image. However, the image capturing apparatus 100 can often prevent artifact formation since the partial regions that fulfill the conditions concerning the distance range stored by the condition storing section 180 are identified as the image regions to be restored.

Figure 18:
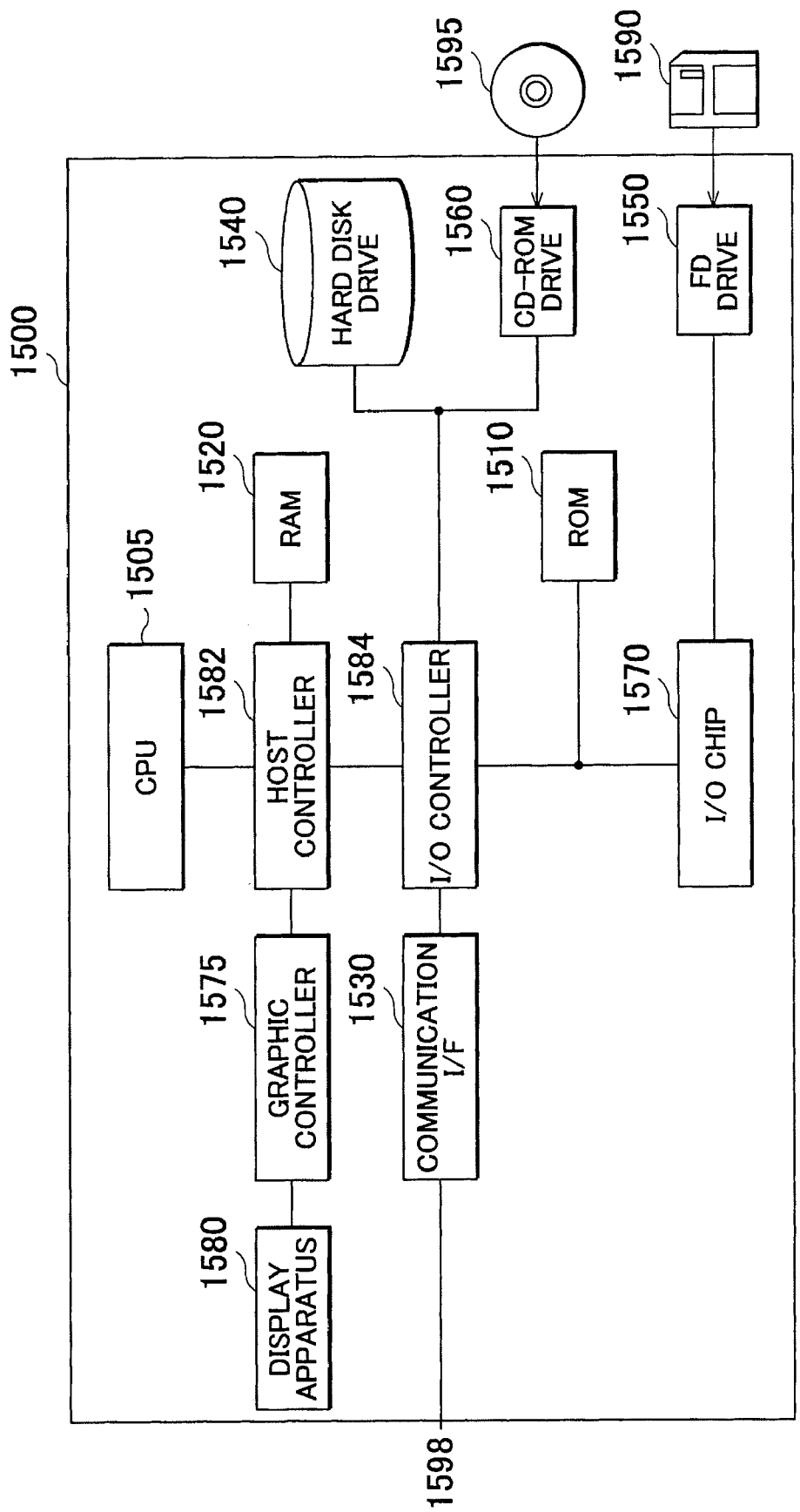
FIG. 18 illustrates an exemplary hardware configuration of a computer 1500 functioning as the image capturing apparatus 100.

FIG. 18 illustrates an exemplary hardware configuration of a computer 1500 functioning as the image capturing apparatus 100. The computer 1500 is constituted by a CPU surrounding section, an input/output (I/O) section and a legacy I/O section. The CPU surrounding section includes a CPU 1505, a RAM 1520, a graphic controller 1575, and a display device 1580 which are connected to each other by means of a host controller 1582. The I/O section includes a communication interface 1530, a hard disk drive 1540, and a CD-ROM drive 1560 which are connected to the host controller 1582 by means of an I/O controller 1584. The legacy I/O section includes a ROM 1510, a flexible disk drive 1550, and an I/O chip 1570 which are connected to the I/O controller 1584.

The host controller 1582 connects the RAM 1520 with the CPU 1505 and graphic controller 1575 which access the RAM 1520 at a high transfer rate. The CPU 1505 operates in accordance with programs stored on the ROM 1510 and RAM 1520, to control the constituents. The graphic controller 1575 obtains image data which is generated by the CPU 1505 or the like on a frame buffer provided within the RAM 1520, and causes the display device 1580 to display the obtained image data. Alternatively, the graphic controller 1575 may include therein a frame buffer for storing thereon image data generated by the CPU 1505 or the like.

The I/O controller 1584 connects, to the host controller 1582, the hard disk drive 1540, communication interface 1530 and CD-ROM drive 1560 which are I/O devices operating at a relatively high rate. The hard disk drive 1540 stores thereon programs and data to be used by the CPU 1505. The communication interface 1530 couples to the network communication apparatus 1598, to transmit/receive programs or data. The CD-ROM drive 1560 reads programs or data from a CD-ROM 1595, and supplies the read programs or data to the hard disk drive 1540 and communication interface 1530 via the RAM 1520.

The I/O controller 1584 is also connected to the ROM 1510, flexible disk drive 1550 and I/O chip 1570 which are I/O devices operating at a relatively low rate. The ROM 1510 stores thereon a boot program executed by the computer 1500 at the start up, programs dependent on the hardware of the computer 1500 and the like. The flexible disk drive 1550 reads programs or data from a flexible disk 1590, and supplies the read programs or data to the hard disk drive 1540 and communication interface 1530 via the RAM 1520. The I/O chip 1570 is used to connect a variety of I/O devices such as the flexible disk drive 1550 via, for example, a parallel port, a serial port, a keyboard port, a mouse port or the like.

The program to be executed by the CPU 1505 is provided by a user in the state of being stored on a recording medium such as the flexible disk 1590, the CD-ROM 1595, and an IC card. The program may be stored on the recording medium in the state of being compressed or not being compressed. The program is installed from the recording medium onto the hard disk drive 1540, read by the RAM 1520, and executed by the CPU 1505. The program executed by the CPU 1505 causes the computer 1500 to function as the A/D converting section 125, the linear processing section 130, the correcting section 140, the non-linear processing section 170, the output section 150, the region identifying section 160, the distance obtaining section 165, the condition storing section 180, the parameter storing section 185, and the correction control section 175 described with reference to FIGS. 1 to 17.

The program mentioned above may be stored on an external recording medium. The recording medium is, for example, an optical recording medium such as DVD and PD, a magnet-optical recording medium such as MD, a tape medium, a semiconductor memory such as an IC card and the like, in addition to the flexible disk 1590 and CD-ROM 1595. The recording medium may be a storage device such as a hard disk or RAM which is provided in a server system connected to a dedicated communication network or the Internet, and the program may be provided to the computer 1500 via the network. In this way, the computer 1500 is controlled by the program to function as the image capturing apparatus 100.

Although some aspects of the present invention have been described by way of exemplary embodiments, it should be understood that those skilled in the art might make many changes and substitutions without departing from the spirit and the scope of the present invention which is defined only by the appended claims.

The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

What is claimed is:

1. An image processing apparatus, comprising:

a region identifying section that identifies a partial region that fulfills a preset condition in a main image captured through an optical system in which an optical transfer function relating to light from an object point is substantially uniform regardless of a distance to the object point; and a correcting section that corrects an image of the partial region identified by the region identifying section, according to the optical transfer function of the optical system; and further comprising a condition storing section that stores the condition to be fulfilled by the partial region corrected by the correcting section, wherein the region identifying section identifies a partial region of the main image that fulfills the condition stored by the condition storing section, wherein the condition storing section stores a condition concerning a distance to a subject, and the region identifying section identifies a partial region in which is captured a subject positioned at a distance that fulfills the condition stored by the condition storing section, wherein the condition storing section stores a range of distance from the optical system over which the optical transfer function is substantially uniform, and the region identifying section identifies a partial region in which is captured a subject positioned within the range of distance stored by the condition storing section.

2. The image processing apparatus according to claim 1, further comprising a distance obtaining section that obtains a distance from the optical system to a subject captured in the main image, wherein the region identifying section identifies a partial region in which the distance obtained by the distance obtaining section for the subject being captured is within the distance range stored by the condition storing section.

3. The image processing apparatus according to claim 1, wherein the condition storing section stores a condition concerning brightness of the image when illumination light illuminates a subject positioned within a range of distance from the optical system to the object point in which the optical transfer function is substantially uniform, and the region identifying section identifies, in the image of the subject illuminated with the illumination light, a partial region whose brightness fulfills the condition concerning the brightness stored by the condition storing section.

4. An image processing apparatus, comprising:

a region identifying section that identifies a partial region that fulfills a preset condition in a main image captured through an optical system in which an optical transfer function relating to light from an object point is substantially uniform regardless of a distance to the object point; and a correcting section that corrects an image of the partial region identified by the region identifying section, according to the optical transfer function of the optical system; and further comprising a condition storing section that stores the condition to be fulfilled by the partial region corrected by the correcting section, wherein the region identifying section identifies a partial region of the main image that fulfills the condition stored by the condition storing section, wherein the condition storing section stores a condition concerning a distance to a subject, and the region identifying section identifies a partial region in which is captured a subject positioned at a distance that fulfills the condition stored by the condition storing section, wherein the condition storing section stores a condition concerning a range of distance from the optical system to each of a plurality of subjects captured in an image region, and the region identifying section identifies a partial region in which each of the plurality of subjects captured in the image region are positioned within a range of distance from the optical system that fulfills the condition concerning the range of distance stored by the condition storing section.

5. The image processing apparatus according to claim 4, wherein the condition storing section stores the condition concerning the range of distance for each of a plurality of image regions, and the region identifying section identifies, in each image region, a partial region that fulfills the condition stored by the condition storing section for the corresponding image region.

6. The image processing apparatus according to claim 4, further comprising a parameter storing section that stores, in association with each of a plurality of distance ranges, a correction parameter corresponding to the optical transfer function over the distance range, wherein the correcting section corrects the image of the partial region identified by the region identifying section using the correction parameter stored by the parameter storing section in association with the range of distances to each subject captured in the partial region.

7. The image processing apparatus according to claim 6, wherein the parameter storing section stores, in association with each of a plurality of distance ranges, a correction parameter for correcting an image of a partial region in a spatial frequency region in which the optical transfer function is substantially uniform over the distance range, according to the optical transfer function, and the correcting section corrects the image of the partial region identified by the region identifying section using the correction parameter stored by the parameter storing section in association with the range of distance to each subject captured in the partial region.

8. An image processing method, comprising:

identifying a partial region that fulfills a preset condition in a main image captured through an optical system in which an optical transfer function relating to light from an object point is substantially uniform regardless of a distance to the object point;

correcting an image of the identified partial region according to the optical transfer function for the partial region of the optical system storing the condition to be fulfilled by the partial region corrected by the correcting section, wherein the region identifying step identifies a partial region of the main image that fulfills the condition stored by the condition storing step, wherein the condition storing step stores a condition concerning a distance to a subject, and the region identifying step identifies a partial region in which is captured a subject positioned at a distance that fulfills the condition stored by the condition storing step, wherein the condition storing step stores a range of distance from the optical system over which the optical transfer function is substantially uniform, and the region identifying step identifies a partial region in which is captured a subject positioned within the range of distance stored by the condition storing step.

9. A computer readable medium storing thereon a program used by an image processing apparatus, the program causing a computer to function as:

a region identifying section that identifies a partial region that fulfills a preset condition in a main image captured through an optical system in which an optical transfer function relating to light from an object point is substantially uniform regardless of a distance to the object point;

a correcting section that corrects an image of the partial region identified by the region identifying section, according to the optical transfer function for the partial region of the optical system;

further comprising a condition storing section that stores the condition to be fulfilled by the partial region corrected by the correcting section, wherein the region identifying section identifies a partial region of the main image that fulfills the condition stored by the condition storing section, wherein the condition storing section stores a condition concerning a distance to a subject, and the region identifying section identifies a partial region in which is captured a subject positioned at a distance that fulfills the condition stored by the condition storing section, wherein the condition storing section stores a range of distance from the optical system over which the optical transfer function is substantially uniform, and the region identifying section identifies a partial region in which is captured a subject positioned within the range of distance stored by the condition storing section.

10. An image processing apparatus, comprising:
a correcting section that corrects an image captured through an optical system in which an optical transfer function relating to light from an object point is substantially uniform regardless of a distance to the object point, according to the optical transfer function of the optical system;
a region identifying section that identifies, in the image corrected by the correcting section, an overcorrected partial region in which an optical response of the optical system is overcorrected; and
a correction control section that suppresses intensity of the correction by the correcting section in the overcorrected partial region identified by the region identifying section.

11. The image processing apparatus according to claim 10, wherein
the region identifying section identifies, in the image corrected by the correcting section, an overcorrected partial region having a frequency region in which an optical response of the optical system is corrected to be greater than a preset value.

12. An image processing method, comprising:
correcting an image captured through an optical system in which an optical transfer function relating to light from an object point is substantially uniform regardless of a distance to the object point, according to the optical transfer function of the optical system;
identifying, in the corrected image, an overcorrected partial region in which an optical response of the optical system is overcorrected; and
controlling intensity of the correction in the identified overcorrected partial region.

13. A computer readable medium storing thereon a program used by an image processing apparatus, the program causing a computer to function as:
a correcting section that corrects an image captured through an optical system in which an optical transfer function relating to light from an object point is substantially uniform regardless of a distance to the object point, according to the optical transfer function of the optical system;
a region identifying section that identifies, in the image corrected by the correcting section, an overcorrected partial region in which an optical response of the optical system is overcorrected; and
a correction control section that suppresses intensity of the correction by the correcting section in the overcorrected partial region identified by the region identifying section.

14. An image processing method, comprising:
identifying a partial region that fulfills a preset condition in a main image captured through an optical system in which an optical transfer function relating to light from an object point is substantially uniform regardless of a distance to the object point; and
correcting an image of the identified partial region according to the optical transfer function for the partial region of the optical system;
storing the condition to be fulfilled by the partial region corrected by the correcting step, wherein
the region identifying step identifies a partial region of the main image that fulfills the condition stored by the condition storing step, wherein
the condition storing step stores a condition concerning a distance to a subject, and
the region identifying step identifies a partial region in which is captured a subject positioned at a distance that fulfills the condition stored by the condition storing step, wherein
the condition storing step stores a condition concerning a range of distance from the optical system to each of a plurality of subjects captured in an image region, and
the region identifying step identifies a partial region in which each of the plurality of subjects captured in the image region are positioned within a range of distance from the optical system that fulfills the condition concerning the range of distance stored by the condition storing step.

15. A computer readable medium storing thereon a program used by an image processing apparatus, the program causing a computer to function as:
a region identifying section that identifies a partial region that fulfills a preset condition in a main image captured through an optical system in which an optical transfer function relating to light from an object point is substantially uniform regardless of a distance to the object point; and
a correcting section that corrects an image of the partial region identified by the region identifying section, according to the optical transfer function for the partial region of the optical system;
a condition storing section that stores the condition to be fulfilled by the partial region corrected by the correcting section, wherein
the region identifying section identifies a partial region of the main image that fulfills the condition stored by the condition storing section, wherein
the condition storing section stores a condition concerning a distance to a subject, and
the region identifying section identifies a partial region in which is captured a subject positioned at a distance that fulfills the condition stored by the condition storing section, wherein
the condition storing section stores a condition concerning a range of distance from the optical system to each of a plurality of subjects captured in an image region, and
the region identifying section identifies a partial region in which each of the plurality of subjects captured in the image region are positioned within a range of distance from the optical system that fulfills the condition concerning the range of distance stored by the condition storing section.

* * * * *